United States Patent [19]

Funatani et al.

[11] Patent Number: 4,548,253
[45] Date of Patent: Oct. 22, 1985

[54] METHOD FOR MAKING COMPOSITE MATERIAL OBJECT BY PLASTIC PROCESSING

[75] Inventors: Kiyoshi Funatani; Tadashi Donomoto; Atsuo Tanaka; Yoshiaki Tatematsu, all of Toyota, Japan

[73] Assignee: Toyota Jidosha Kabushiki Kaisha, Toyota, Japan

[21] Appl. No.: 525,992

[22] Filed: Aug. 24, 1983

[30] Foreign Application Priority Data

Oct. 8, 1982 [JP] Japan .................. 57-177049

[51] Int. Cl.$^4$ .................. B22D 23/00; B22D 23/06
[52] U.S. Cl. .................. 164/80; 164/97; 164/105; 164/900
[58] Field of Search .................. 164/80, 97-98, 164/105, 108-110, 900

[56] References Cited

U.S. PATENT DOCUMENTS 3,668,748  6/1972  Divecha et al. .................. 164/97
3,970,136  7/1976  Cannell et al. .................. 164/108
4,266,596  5/1981  Ban et al. .................. 164/97

OTHER PUBLICATIONS

"Rheocasting Processes", Flemings et al., *AFS International Cast Metals Journal*, Sep. 1976, pp. 11-21.

*Primary Examiner*—Nicholas P. Godici
*Assistant Examiner*—Richard K. Seidel
*Attorney, Agent, or Firm*—Oblon, Fisher, Spivak, McClelland & Maier

[57] ABSTRACT

First a reinforcing material mass is formed from a quantity of reinforcing material by binding it together with inorganic binder, and then this reinforcing material mass is compounded with matrix metal to form a composite material mass. Then the composite material mass is heated up so that the proportion of the matrix metal thereof which is in the liquid phase is at least 40%, and while still hot it is subjected to a plastic processing process to form the composite material object.

10 Claims, 9 Drawing Figures

METHOD FOR MAKING COMPOSITE MATERIAL OBJECT BY PLASTIC PROCESSING

BACKGROUND OF THE INVENTION

The present invention relates to a method of manufacture of a shaped object from a composite material such as a composite material reinforced with reinforcing material, and more particularly relates to a method of manufacture of such a shaped object from a composite material which employs plastic processing, and in which the composite material is brought to be partially or totally in the molten state before the plastic processing, in order to render the ease of the plastic processing greater.

In motor vehicles and aircraft and so forth, nowadays, the constant demand for lightening and strengthening and providing higher performance of structural members and parts, with the objects, among others, of providing energy savings by reducing fuel consumption, of increasing durability, and also of providing higher traveling speeds, has meant that construction from light metallic alloys such as aluminum alloy or magnesium alloy has become common. Problems arise, however, in making parts from light metallic alloys, despite the light weight of these alloys, and despite their easy workability, because the mechanical characteristics of these alloys such as wear resistance, and such as strength including bending resistance, torsion resistance, tensile strength, and so on, are inferior to those of competing materials such as steel. Further, the occurrence of cracking and the spreading of cracks in parts made of aluminum or magnesium or other light metal alloys can be troublesome. Therefore, for parts the strength and/or wear resistance of which is critical there are limits to the application of light metallic alloys.

Accordingly, for such critical members, it has become known and practiced for them to be formed out of so called two phase or composite materials, in which reinforcing material is dispersed within a matrix of metal. If the matrix metal is an aluminum or magnesium alloy, for example, then the advantages with regard to weight of using this aluminum or magnesium alloy as a constructional material can be obtained to a large degree, while avoiding many of the disadvantages with regard to low strength and crackability; in fact, the structural strength of the composite materials made in this way can be very good, and the presence of the reinforcing material can stop the propagation of cracks through the aluminum or magnesium alloy matrix metal.

The reinforcing material conventionally has been known as for example being alumina fibers, carbon fibers, silicon carbide whiskers, or possibly mixtures thereof, and the matrix metal has been known as for example being various types of aluminum or magnesium alloy, as mentioned above; and various proposals have been made with regard to compositions for such fiber reinforced metal type composite materials, and with regard to methods of manufacture thereof.

With regard to methods of manufacture of composite materials, various methods of manufacture have been tried, such as the high pressure casting method, the centrifugal casting method, the die cast method, the low pressure casting method, and the autoclave method. But of these the most generally and usefully applicable has so far been the high pressure casting method, in view of the low cost of the fiber reinforced metal type composite material produced thereby, and the manufacturing efficiency attained thereby. In this per se well known high pressure casting method, a mass of reinforcing fibers is placed in the mold cavity of a casting mold, and then a quantity of molten matrix metal is poured into the mold cavity. The free surface of the molten matrix metal is then pressurized to a high pressure such as approximately 1000 kg/cm$^2$ by a plunger or the like, which may be slidingly fitted into the mold. Thereby the molten matrix metal is intimately infiltrated into the interstices of the mass of reinforcing fibers, under the influence of this pressure. This pressurized state is maintained until the matrix metal has completely solidified. Then finally, after the matrix metal has solidified and cooled into a block, this block is removed from the casting mold, and the surplus matrix metal around the reinforcing fibers may be removed by machining, so that the composite material mass itself, consisting of the mass of reinforcing fibers impregnated with matrix metal, is isolated. This high pressure casting method has the advantage of low cost, and it is possible thereby to manufacture pieces of composite material of different shapes including quite complicated shapes with high efficiency.

Now, however, since such reinforcing fiber materials are vastly harder than the aluminum or magnesium alloy matrix metal in which they are embedded, therefore finishing operations for parts or other objects formed of such composite materials including such reinforcing fiber materials become much more difficult. Further, during use of the parts, other problems occur: for example, the wear on mating or cooperating members which rub against such parts, sliding relatively to them, may become very great.

Specifically, the principal methods for forming a finished part or other object of such a composite material fall into the two general categories of machining processes and plastic processes.

In the case of machining processes, when a part preform or roughly manufactured object made from such composite material is subjected to finishing machining, since the reinforcing material is very much harder than the matrix metal, and in the case of for example silicon carbide whiskers has a hardness second only to diamond, this machining is very difficult and expensive, and great wear on the machining tools is caused; and also the resulting machined surfaces on the finished object are often very rough and poorly finished, which cauess the problems associated with wear on a mating or cooperating member to be even more particularly marked. Further, the existence of such rough finished surfaces means that it can often occur during rubbing of the finished composite material part against a mating member that reinforcing particles of the finished composite material part can become dislodged from the matrix metal in which they are embedded, especially large sized such reinforcing particles, and thus scuffing of the material of such a mating or cooperating member may well occur, which can cause great damage to such a member. Thus machining finishing of a composite material object or part is expensive and not suited for volume production.

On the other hand, in the case of plastic processes for forming objects from composite material, such as forging or extrusion processes, when these are applied to the composite material in substantially the cold state, since the plastic flowing of the composite material under stress is impeded by the presence of the composite reinforcing material therein, the process cannot be performed at an acceptable rate, and other problems arise, such as that very high pressure is required, or that a particular desired orientation which has been set up for the reinforcing fibers or other reinforcing material in advance is disturbed, or that some of the reinforcing fibers are broken.

Because of the above described type of difficulties which occur when applying plastic processing for forming objects from composite material, it has been considered to apply the process of applying to the composite material a semi molten type plastic process, of a type which have been developed for materials which are difficult to process. In such a semi molten type of process, the composite material is heated up so that the matrix metal thereof is partly in the molten state, and thus it is easier to deform plastically. But, as the liquid or molten phase proportion of the matrix metal is increased, handling of the composite material becomes more and more difficult; and, as described for example in U.S. Pat. No. 3,668,748, it is impracticable to increase the liquid phase proportion of the matrix metal to above 25%. Thus, with such a semi molten type of processing method for forming objects out of composite material, in the prior art it has not been possible to perform production as satisfactorily, or as quickly, as could be wished; and further the problems described above with regard to the cold type of plastic process are not fully resolved.

SUMMARY OF THE INVENTION

Now, the inventors of the present application have considered the above mentioned problems with respect to finishing operations for an object manufactured from a composite material, and have conducted various experimental researches into the manufacture of objects from composite materials, some of which will be detailed later in this specification, as a result of which they have come to certain conclusions which form the essence of the present invention. In particular, the present inventors have found that it is practicable to increase the liquid phase proportion of the matrix metal, in such a semi molten type plastic processing operation, to substantially higher than in the prior art, provided that the composite material used is one in which the reinforcing material such as fibers or the like is bonded together by inorganic binder, and that by such a process it is possible to process a composite material with a very substantially lower applied pressure, as compared with the case of processing such a composite material by a prior art type conventional semi molten processing method, and further to obtain a substantially higher efficiency of production and processing. Further, the present inventors have found that, in order to best reap the advantages of the present invention, it is desirable to maintain the amount of the reinforcing material within the composite material within specific limits, i.e. to keep it not too high and not too low. Further, the inventors of the present application have also found that it is desirable that the compression strength of the reinforcing material mass, before a high pressure casting process is performed to produce the composite material, should be maintained within specific limits, i.e. should not be too high or too low. Further, the inventors of the present application have also found that certain materials are particularly effective for use as the inorganic binder for bonding together the reinforcing material.

Accordingly, it is the primary object of the present invention to provide a method for making a composite material object by plastic processing, which avoids the above described problems.

It is a further object of the present invention to provide such a method for making a composite material object, which allows various parts to be efficiently and conveniently manufactured.

It is a further object of the present invention to provide such a method for making a composite material object, which facilitates finishing operations for the object.

It is a further object of the present invention to provide such a method for making a composite material object, which minimizes wear upon finishing tools during manufacture of the object.

It is a further object of the present invention to provide such a method for making a composite material object, which does not leave rough and poorly finished surfaces.

It is a further object of the present invention to provide such a method for making a composite material object, which avoids scuffing of a mating or rubbing member, during use of the object.

It is a further object of the present invention to provide such a method for making a composite material object, which is cheap to perform.

It is a further object of the present invention to provide such a method for making a composite material object, which is suitable for volume production.

It is a further object of the present invention to provide such a method for making a composite material object, which can be performed at an acceptable rate.

It is a further object of the present invention to provide such a method for making a composite material object, which does not require the use of extremely high pressure.

According to the most general aspect of the present invention, these and other objects relating to a method are accomplished by a method for producing a composite material object by plastic processing, wherein in the specified order: (a) a reinforing material mass is formed from a quantity of reinforcing material by binding it together with inorganic binder; (b) said reinforcing material mass is compounded with matrix metal to form a composite material mass; (c) said composite material mass is heated up so that the proportion of the matrix metal thereof which is in the liquid phase is at least 40%; and (d) said heated composite material mass while still hot is subjected to a plastic processing process to form said composite material object.

According to such a method, during the handling of the heated composite material mass, for example between step (c) and step (d), even if the liquid phase proportion of the matrix metal is at or close to 100%, the shape of this composite material mass is roughly preserved by the reinforcing material which is present within it, which holds it in its desired form, acting as a so called framework therefor. This is practicable because the reinforcing material mass, during step (a), is bound together with the inorganic binder, so that it has a certain compressive strength, and is sufficiently coherent for bracing the partially or completely molten matrix metal. Also this good stength of the reinforcing material mass is important for preventing distortion of said reinforcing material mass during step (b) when it is commingled with the matrix metal. Thus, as compared with the conventional types of semi molten plastic processing described above, the heated composite material mass is much more easy to handle, so that a much greater liquid phase proportion of at least 40% for the matrix metal of the heated composite material may be employed as specified in step (c) above, as compared with the above identified prior art in which this liquid phase proportion was limited to about 25%; and as a result of this the plastic flowing during forging, extrusion, or rolling processes or the like of the heated composite material is easy, and accordingly such processes can be carried out with vastly less applied pressure and much more quickly than in the prior art. Accordingly this method is cheap to perform, and is suitable for mass production, allowing the finished objects to be manufactured conveniently and efficiently. Because the finished object can be produced by such a method as forging or extrusion, therefore very little or in the best case no post finishing by machining is required to be performed thereon, and accordingly these finishing operations are facilitated, and the wear on the finishing tool is minimized, yet without any risk of leaving poorly machined or rough finished surfaces, which could as mentioned above cause undue wear on, or scuffing of, a cooperating member during use of the finished product.

Because a liquid phase proportion of at least 40% for the matrix metal of the heated composite material is employed in the case of the present invention as specified in step (c) above, and because as stated above much less pressure is required to be used during the plastic flowing process of the heated composite material, thereby the entire plastic flowing process is more gentle, and thereby substantial numbers of the fibers in the reinforcing material, if this is in fact fibrous as is preferred, are not broken, during this plastic flowing process, which means that the finished object is high in tensile strength and in wear resistance. Also, because of the above explained relative gentleness of the plastic flowing process, if the fibers of such a fibrous reinforcing material are oriented in a desired orientation before the plastic flowing process, they are not so likely to be disturbed during the plastic flowing. On the other hand, in some applications, as will be seen later it may be desired to increase the strength or other characteristics of the finished product in one particular direction which is the direction of plastic flow, i.e. anisotropically, and in such a case during the process of plastic flowing a desired orientation of the reinforcing fibers may actually be promoted by the plastic flowing process, due again to the high liquidity of the matrix metal at this time.

Further, according to a more particular aspect of the present invention, these and other objects are more particularly and concretely accomplished by a method for producing a composite material object of the sort described above, wherein the volume proportion of reinforcing material in said composite material mass, after step (b), is at least about 3%; and even better, is at least about 10%.

According to such a method, the desired characteristics of the finished object, such as for example high tensile strength, high wear resistance, and so on, are more positively ensured.

Further, according to another particular aspect of the present invention, these and other objects are more particularly and concretely accomplished by a method for producing a composite material object of any of the sorts described above, wherein the volume proportion of reinforcing material in said composite material mass, after step (b), is less than about 60%; and even better, is less than about 40%.

According to such a method, it is ensured that not so much reinforcing material should be present as to make the plastic processing of the resulting composite material according to the present invention difficult, even if the liquid phase proportion of the matrix metal, during step (d) above, should be as high as nearly 100%. The above specified limits have been found by the present inventors to be reasonable ones, depending of course on the exact nature of the reinforcing material.

Further, according to another particular aspect of the present invention, these and other objects are more particularly and concretely accomplished by a method for producing a composite material object of any of the sorts described above, wherein the reinforcing material is fibrous.

According to such a method, as explained above, many of the advantages of the present invention become much more salient.

Further, according to another particular aspect of the present invention, these and other objects are more particularly and concretely accomplished by a method for producing a composite material object of any of the sorts described above, wherein the compression strength of the reinforcing material mass, after step (a), is greater than about 0.5 kg/cm$^2$; and, even better, is greater than about 0.7 kg/cm$^2$.

According to such a method, it is made more definitely ensured that the shape of the composite material will be preserved by the reinforcing material, when the composite material is heated during step (d) for plastic processing; the experimental researches detailed later that have been performed by the present inventors will make this clear in detail. The exact best value of the compressive strength of the reinforcing material mass of course will depend upon the exact materials involved, including the type and amount of inorganic binder employed.

Further, according to another particular aspect of the present invention, these and other objects are more particularly and concretely accomplished by a method for producing a composite material object of any of the sorts described above, wherein the compression strength of the reinforcing material mass, after step (a), is less than about 20 kg/cm$^2$; and, even better, is less than about 15 kg/cm$^2$.

According to such a method, it is ensured that the reinforcing material mass should not be so strong as to make the plastic processing of the resulting composite material according to the present invention difficult, i.e. should not be so strong as to impede the plastic flowing of the heated composite material, even if the liquid phase proportion of the matrix metal, during step (d) above, should be as high as nearly 100%. The above specified limits have been found by the present inventors to be reasonable ones, depending of course on the exact nature of the reinforcing material and the exact temperature and liquid phase proportions for the matrix metal utilized during step (d) above.

Suitable materials for use as the inorganic binder which is used in step (a) as described above for binding together the reinforcing material to form the reinforcing material mass include silica, alumina, zirconia, chromia, ceria, zirconium silicate, ferric oxide, aluminum phosphate, or waterglass. These have been found to be particularly effective for such a purpose. Further, suitable methods for use in step (b) as described above for compounding the reinforcing material and the matrix metal include the high pressure casting method, the centrifugal casting method, the die cast method, the low pessure casting method, and the autoclave method.

BRIEF DESCRIPTION OF THE DRAWINGS

The present invention will now be shown and described with reference to several preferred embodiments thereof, and with reference to the illustrative drawings. It should be clearly understood, however, that the description of the embodiments, and the drawings, are all of them given purely for the purposes of explanation and exemplification only, and are none of them intended to be limitative of the scope of the present invention in any way, since the scope of the present invention is to be defined solely by the legitimate and proper scope of the appended claims. In the drawings, like parts and features are denoted by like reference symbols in the various figures thereof, and:

DETAILED DESCRIPTION OF THE PREFERRED EMBODIMENTS

The present invention will now be described with reference to several preferred embodiments thereof, and with reference to the appended drawings.

THE FIRST PREFERRED EMBODIMENT

Figure 4:
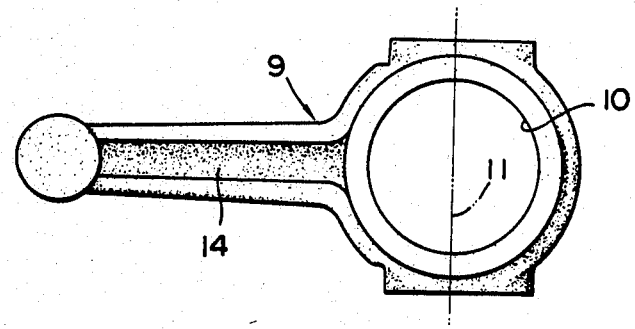
FIG. 4 is a front elevational view of the connecting rod preform made according to the first embodiment of the present invention by the forging device of FIGS. 2 and 3, as removed from the device.

In the first preferred embodiment of the method for producing a composite material object by plastic processing according to the present invention, a connecting rod for a gasoline internal combustion engine was fabricated; and FIG. 4 is a front elevational view of this connecting rod, which was made as follows.

First, a mass of silicon carbide whiskers, of average whisker diameter 0.5 microns and average whisker length 100 microns, oriented substantially randomly in three dimensions, was dispersed in a 30% aqueous solution of colloidal silica and then stirred up, and then by drying at room temperature a silicon carbide whisker body was formed. The compressive strength of the silicon carbide whisker body was made to be about 5.0 kg/cm$^2$. The individual silicon carbide whiskers in this whisker body were oriented randomly in all three spatial coordinates, i.e., they had a so called three dimensional random orientation. The proportion of the volume of the whisker body that was actually occupied by silicon carbide whiskers was about 40%.

Figure 1:
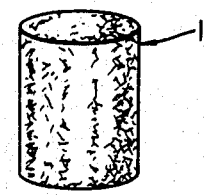
FIG. 1 is a perspective view of a billet of composite reinforced material, which is of a cylindrical shape, and is used as a raw material, in the first embodiment of the method for making a composite material object by plastic processing according to the pressent invention.

Next, the silicon carbide whisker body was placed within the mold cavity of a casting mold, and then into this mold cavity was poured a quantity of molten aluminum alloy at approximately 780° C., which was composed of aluminum alloy of JIS standard 2024. The molten aluminum alloy was then pressurized by a plunger sliding in the mold to a pressure of approximately 1000 kg/cm$^2$, and this pressure was maintained while the molten aluminum alloy cooled, until it was completely solidified. Thereby, a block of silicon carbide whisker-aluminum alloy composite material surrounded by aluminum alloy was manufactured, by this so called high pressure casting method. Then, from the portion of this block which was made of composite material, i.e. from the portion thereof reinforced by silicon carbide whiskers, a billet 1 was made, as shown in FIG. 1, about 50 mm in diameter and 85 mm in length.

This billet 1 was heated to a temperature of 660° C. for approximately 60 minutes, so that the aluminum alloy matrix metal had a liquid phase proportion of virtually 100%, i.e. was completely in the molten state. At this time, the billet 1 cohered only by virtue of the reinforcing silicon carbide whiskers incorporated therein. Next, the billet 1 heated as described above was quickly introduced into a bore 7 of a hot forging device 6, as shown in longitudinal section in FIG. 2. This forging device 6 had an upper mold portion 4 and a lower mold portion 5 which were at this time clamped together, and within these mold portions 4 and 5 were respectively defined upper and lower mold cavities 2 and 3, which together defined the shape of a connecting rod. The bore 7 was formed in the upper mold portion 6. At the time of introduction of the billet 1 into the bore 7, the upper and lower mold portions 4 and 5 were heated up to a temperature of about 300° C. Next, a plunger 8 was slid into the bore 7 to impinge upon the hot billet 1, and was pressed thereagainst with a pressure of about 4000 kg/cm², so as to force the material of the billet 1, in the plasticized state described above, to fill the space defined by the upper and lower mold cavities 2 and 3, and to conform closely thereto. This state of the apparatus is illustrated in FIG. 3, which is a section similar to FIG. 2. It will be noted that at this time, although the pressure end of the plunger 8 was pressed inwards, as seen in FIG. 3, so far as to intrude into the mold cavity of the forging device 6, this caused no problem, because the depression in the formed mass of composite material caused by this intrusion of the end of the plunger 8 was in a part of the mass which in any case was required to be machined away later, as will be explained shortly. This pressure exerted by the plunger 8 was maintained while the composite material cooled, and until the aluminum alloy matrix metal of the composite material had completely solified; and thus by so called single stage forging a connecting rod rough preform 9 was formed, which was then removed from the forging device 6.

Figure 5:
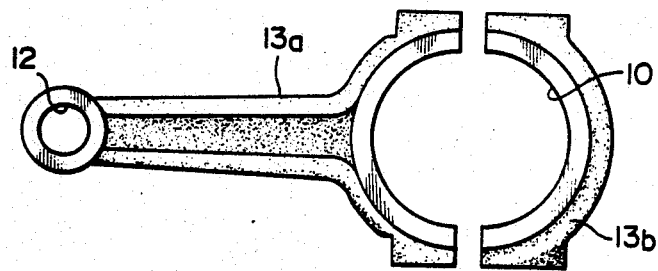
FIG. 5 is a front elevational view, similar to FIG. 4, of the finished connecting rod, as machined from the preform of FIG. 4.

A front elevational view of this connecting rod preform 9 is shown in FIG. 4. In this figure, the arm portion is designated by the reference numeral 14. Next, after the preform 9 was subjected to heat treatment $T_4$, the crankshaft through hole 10 was finished by grinding, a cut was made along the line 11 as shown in FIG. 4 to form the connecting rod end cap, and a hole 12 was drilled in the other end of the connecting rod for a gudgeon pin, thus producing the finished connecting rod 13a and end cap 13b as shown in FIG. 5. As compared with a conventional connecting rod made out of steel which had the same strength and was made by the so called three stage forging method, this connecting rod was 40% lighter.

Next, from the arm portion 14 of another connecting rod preform 9 made in the same way as described above, a tension test sample was cut, of parallel length along the longitudinal direction of the connecting rod preform 9 of about 25 mm, and of parallel diameter 5 mm; and tensile strength tests were performed thereon. The tensile strength was found to be 60 kg/mm². Further, a similar comparison sample was cut from the arm portion of a connecting rod preform made from an identical composite material to the one described above by a per se conventional two stage forging process, in which the liquid phase proportion of the matrix metal was set to 20%. The tensile strength of this comparison sample was found to be 53 kg/mm².

Now, it was surmised that the difference in tensile strength was due to preferential alignment of the reinforcing silicon carbide whiskers along the direction of deformation of the composite material. In an effort to verify this, the tensile test sample of the connecting rod preform 9 made according to the present invention was sectioned, and the section was examined under a microscope. However, because the silicon carbide whiskers were very fine, no conclusion could be drawn from this examination, since it was too difficult to discriminate the reinforcing silicon carbide whiskers from the aluminum alloy matrix metal; the result of this investigation was therefore a failure.

But the following matters are surmised by the present inventors. Since according to the present invention the liquid phase proportion of the at least semi molten matrix metal of the composite material which is being plastically processed is kept high, over 40%, which is practicable because the overall shape of the composite material is maintained at this time by the reinforcing material thereof which is held together by the inorganic binder, therefore, when the forging process is carried out and the composite material is plastically deformed, as for example in the shown first preferred embodiment when the billet 1 is plastically deformed by the pressure of the plunger 8 and flows into the mold cavities 2 and 3 and particularly along the space thereof which defines the arm portion 14 of the connecting rod preform 9, during this plastic deformation process the reinforcing silicon carbide whiskers become preferentially oriented along the direction of plastic flow, without becoming unduly damaged during this orientation procedure as may be the case in a type of such plastic deformation in which the liquid phase proportion of the at least semi molten matrix metal of the composite material is lower such as around 20%. Thus, due to this preferential orientation, the strength of the finished product is increased in this direction of plastic deformation, by the desirable orientation of the reinforcing fibers along this direction.

THE SECOND PREFERRED EMBODIMENT

Figure 6:
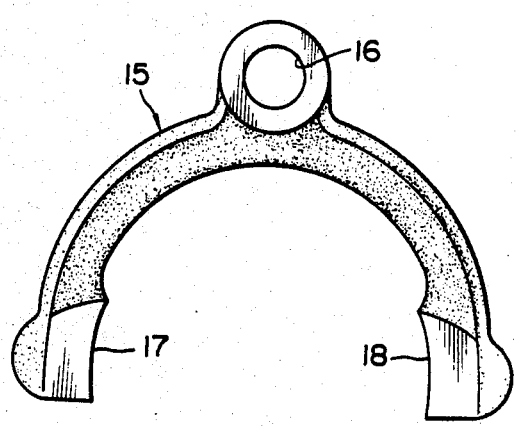
FIG. 6 is a front elevational view of a finished selector shift fork of a transmission, which was produced according to a second preferred embodiment of the method for producing a composite material object by plastic processing according to the present invention.

FIG. 6 is a front elevational view of a selector shift fork of a transmission, which was produced according to a second preferred embodiment of the method for producing a composite material object by plastic processing according to the present invention. This selector shift fork was made as follows.

First, a mass of silicon nitride whiskers, of average whisker diameter 1.3 microns and average whisker length 200 microns, oriented substantially randomly in three dimensions, was dispersed in a 30% aqueous solution of colloidal silica and then stirred up, and then by drying at room temperature a silicon nitride whisker body was formed. The compressive strength of the silicon nitride whisker body was made to be about 3.5 kg/cm². The individual silicon nitride whiskers in this whisker body were oriented randomly in all three spatial coordinates, i.e., they had a so called three dimensional random orientation. The proportion of the volume of the whisker body that was actually occupied by silicon nitride whiskers was about 30%.

Next, the silicon nitride whisker body was placed within the mold cavity of a casting mold, and then into this mold cavity was poured a quantity of molten aluminum alloy at approximately 650° C., which was composed of aluminum alloy of JIS standard ADC12. The molten aluminum alloy was then pressurized by a plunger sliding in the mold to a pressure of approximately 1000 kg/cm², and this pressure was maintained while the molten aluminum alloy cooled, until it was completely solidified. Thereby, a block of silicon nitride whisker-aluminum alloy composite material surrounded by aluminum alloy was manufactured, by this so called high pressure casting method.

Then, as before, from the portion of this block which was made of composite material, i.e. from the portion thereof reinforced by silicon nitride whiskers, a cylindrical billet of length about 20 mm and diameter about 18 mm was made. This billet was, this time, heated to a temperature of only 560° C. for approximately 60 minutes, so that the aluminum alloy matrix metal this time had a liquid phase proportion of only about 50%, i.e.

was only about half in the molten state. At this time, the billet cohered again largely by virtue of the reinforcing silicon nitride whiskers incorporated therein. Next, the billet heated as described above was quickly introduced into the lower mold portion of a hot forging device, which had upper and lower mold portions within which were respectively defined upper and lower mold cavities which together defined the shape of a selector shift fork preform, said upper and lower mold portions being separated at this time. At the time of introduction of the billet into the forging device, the upper and lower mold portions were heated up to a temperature of about 300° C. Next, the upper and lower mold portions were pressed together with a pressure of about 4000 kg/cm$^2$, so as to force the material of the billet, in the plasticized state described above, to fill the space defined by the upper and lower mold cavities, and to conform closely thereto. This pressure was maintained while the composite material cooled, and until the aluminum alloy matrix metal of the composite material had completely solified; and thus by so called single stage forging a selector shift fork rough preform was formed, which was subsequently removed from the forging device.

Next, a through hole 16 for a mounting shaft was finished by grinding, and engaging surfaces 17 and 18 for engaging with a hub sleeve of a synchronizer device of a transmission were also machined by grinding. A front elevational view of the resulting selector shift fork 15 is shown in FIG. 6. As compared with a conventional selector shift fork made out of aluminum alloy, which had the same strength and was made by the so called die cast method, this selector shift fork 15 was compacter and lighter; and further the resistance to wear of the engaging surfaces 17 and 18 was also vastly superior.

THE THIRD PREFERRED EMBODIMENT

Figure 7:
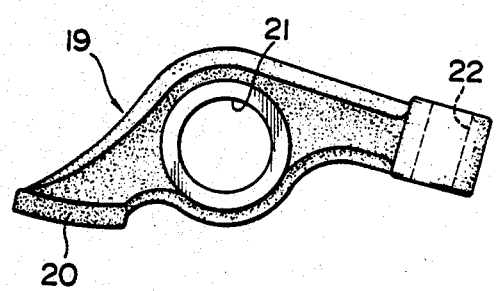
FIG. 7 is a front elevational view of a finished rocker arm of a gasoline internal combustion engine, which was produced according to a third preferred embodiment of the method for producing a composite material object by plastic processing according to the present invention.

FIG. 7 is a schematic structural view of a rocker arm of a gasoline internal combustion engine, which was produced according to a third preferred embodiment of the method for producing a composite material object by plastic processing according to the present invention. This rocker arm was made as follows.

First, a mass of potassium titanate whiskers, of average whisker diameter 0.3 microns and average whisker length 20 microns, of type "TISSUMO" (registered trademark) made by Ohtsuka Kagaku Yakuhin K.K., oriented substantially randomly in three dimensions, were dispersed in a 20% aqueous solution of colloidal alumina and then stirred up, and then by drying at room temperature a potassium titanate whisker body was formed, held together securely by the dried aluminum, which functioned as an inorganic binder. The compressive strength of the potassium titanate whisker body was made to be about 2.3 kg/cm$^2$. The individual potassium titanate whiskers in this whisker body were oriented randomly in all three spatial coordinates, i.e., they had a so called three dimensional random orientation. The proportion of the volume of the whisker body that was actually occupied by potassium titanate whiskers was about 25%.

Next, the potassium titanate whisker body was placed within the mold cavity of a casting mold, and then into this mold cavity was poured a quantity of molten aluminum alloy at approximately 730° C., which was composed of aluminum alloy of JIS standard AC4C. The molten aluminum alloy was then pressurized by a plunger sliding in the mold to a pressure of approximately 1000 kg/cm$^2$, and this pressure was maintained while the molten aluminum alloy cooled, until it was completely solidified. Thereby, a block of potassium titanate whisker—aluminum alloy composite material surrounded by aluminum alloy was manufactured, by this so called high pressure casting method.

Then, as before, from the portion of this block which was made of composite material, i.e. from the portion thereof reinforced by potassium titanate whiskers, a cylindrical billet of length about 60 mm and diameter about 20 mm was made. This billet was, this time, heated to a temperature of about 600° C. for approximately 60 minutes, so that the aluminum alloy matrix metal this time had a liquid phase proportion of about 80%, i.e. was about four fifths in the molten state. At this time, the billet again cohered largely by virtue of the reinforcing potassium titanate whiskers incorporated therein.

Figure 2:
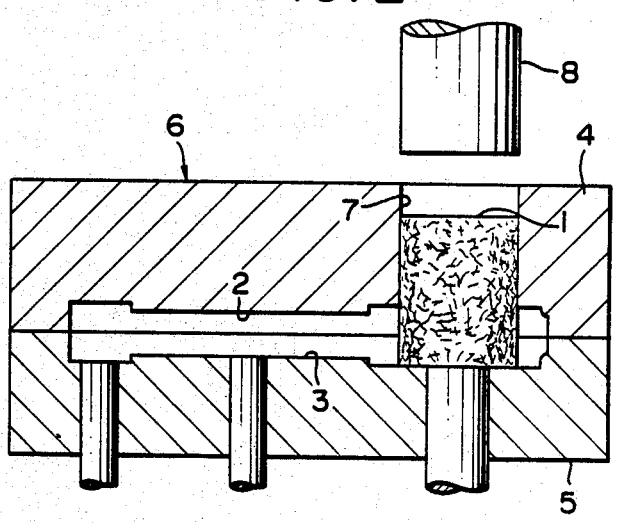
FIG. 2 is a longitudinal sectional view of a forging device for making a connecting rod for an internal combustion engine, which is used in said first embodiment of the method according to the present invention, showing the device in an earlier stage of said first embodiment in which the billet of FIG. 1 is introduced into a bore thereof.
Figure 3:
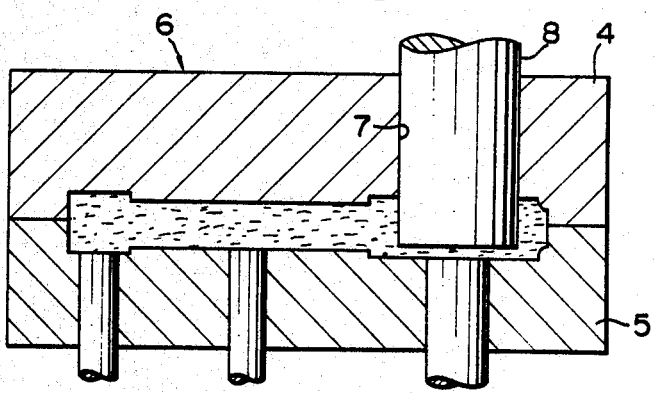
FIG. 3 is a longitudinal sectional view, similar to FIG. 2, of the forging device for making a connecting rod of FIG. 2, showing the device in a later stage of said first embodiment, in which a plunger introduced into said bore has squeezed the material of said billet of FIG. 1 to fill a mold cavity thereof.

Next, the billet heated as described above was quickly introduced into a bore of a hot forging device, which was of the same type as the hot forging device 6 of the first preferred embodiment of the present invention shown in FIGS. 2 and 3, having an upper mold portion and a lower mold portion which were at this time clamped together, and within which were respectively defined upper and lower mold cavities which together defined the shape of a rocker arm. The bore was formed in the upper mold portion, and was araned to extend contiguously with the portion of said upper mold portion. At the time of introduction of the billet into the bore of the forging device, the upper and lower mold portions were heated up to a temperature of about 300° C. Next, a plunger was slid into the bore to impinge upon the hot billet, and was pressed thereagainst with a pressure of about 3500 kg/cm$^2$, so as to force the material of the billet, in the plasticized state described above, to fill the space defined by the upper and lower mold cavities, and to conform closely thereto. This pressure exerted by the plunger was maintained while the composite material cooled, and until the aluminum alloy matrix metal of the composite material had completely solified; and thus by so called single stage forging a rocker arm rough preform was formed, which was then removed from the forging device.

Next, a through hole 21 for a rocker arm support shaft was finished by grinding, and a valve shaft through hole 22 was also machined by grinding. A front elevational view of the resulting rocker arm 19 is shown in FIG. 6, in which also a cast iron friction pad 20 for rubbing against the camshaft can be seen. In this case, the bore was formed to directly communicate with a middle portion of the mold cavity defined by the upper and lower mold cavities of the upper and lower casting mold portions, and the cast iron friction pad 20 had been placed in the mold cavity at a properly determined position before the billet was introduced into the mold cavity.

As compared with a conventional rocker arm made out of aluminum alloy, which had the same strength and was made by a casting method, this rock arm 19 was about 20% lighter.

THE FOURTH PREFERRED EMBODIMENT

Next, as a fourth preferred embodiment of the method for producing a composite material object by plastic processing according to the present invention, two test samples for wear resistance evaluation were made of composite material which had been processed according to the present invention. These wear test samples were made as follows.

First, a mass of alumina-silicate fibers, of average fiber diameter 2.8 microns and average fiber length 2 mm, of type "KAOWOOL" (registered trademark) may by Isolite Babcock Fireproof K.K., oriented substantially randomly in three dimensions, was dispersed in a 20% aqueous solution of colloidal alumina and then stirred up, and then by drying at room temperature two alumina-silicate fiber bodies were formed, held together securely by the dried alumina, which functioned as an inorganic binder. The compressive strengths of the alumina-silicate fiber bodies were made to be respectively about 0.8 kg/cm$^2$ and about 1.5 kg/cm$^2$. The individual alumino-silicate fibers in these fiber bodies were oriented randomly in all three spatial coordinates. The proportions of the volumes of the fiber bodies that were actually occupied by alumino-silicate fibers were respectively about 5% and about 10%.

Next, these two alumino-silicate fiber bodies were successively placed within the mold cavity of a casting mold, and then were pressure compounded, in a similar manner to that practiced in the first three embodiments described above, with molten aluminum alloy at approximately 740° C., which was aluminum alloy of JIS standard AC8A, at a pressure of approximately 1000 kg/cm$^2$, and this pressure was maintained while the molten aluminum alloy cooled, until it was completely solidified. Thereby, two blocks of alumino-silicate fiber-aluminum alloy composite material surrounded by aluminum alloy were manufactured, by this so called high pressure casting method.

Then, as before, from the portion of each of these blocks which was made of composite material, i.e. from the portion thereof reinforced by silicate fibers, a block about 18 mm by 35 mm by 35 mm was made. Each of these two blocks was then heated up to a temperature of about 600° C. for approximately 60 minutes, so that the aluminum alloy matrix metal this time had a liquid phase proportion of about 40%, i.e. was about two fifths in the molten state. At this time, these blocks again cohered largely by virtue of the reinforcing alumino-silicate fibers incorporated therein.

Next, in turn each of the blocks while heated as described above was quickly introduced into a hot forging press and was forged therein at a pressure of approximately 3500 kg/cm$^2$. At the time of introduction of the blocks into the forging press, this press was heated up to a temperature of about 300° C., and the pressure exerted by the press was maintained while the composite material cooled, and until the aluminum alloy matrix metal of the composite material had completely solified; and thus by so called single stage forging two blocks shaped test samples, respectively denoted by the symbols A and B, were formed, of dimensions about 6 mm by 10 mm by 16 mm, which were then removed from the forging press.

Figure 8:
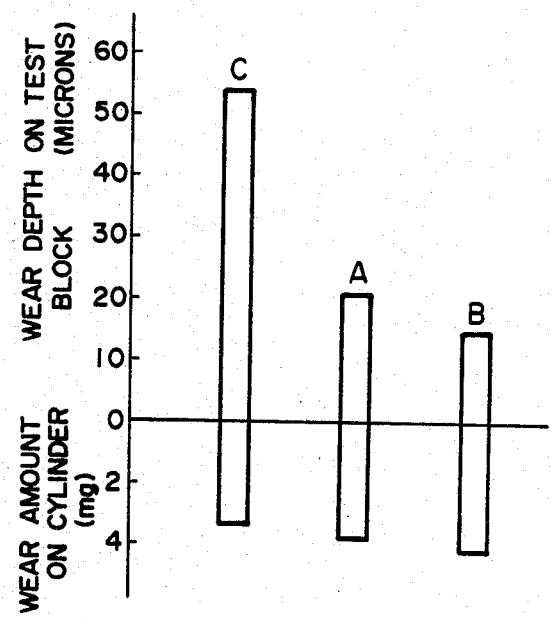
FIG. 8 is a bar chart relating to the test results of the fourth preferred embodiment of the present invention, showing results of LFW wear tests upon three test blocks A, B, and C, in which wear depth on each test block in microns is shown above the horizontal line and wear amount on a mating member in milligrams is shown below the horizontal line.

Next, LFW frictional wear tests were then performed upon the thus formed wear test samples A and B, using as mating members ring shaped samples of granular graphite cast iron, JIS standard FCD70, of diameter about 35 mm; and the same tests were also carried out upon a similarly shaped comparison test sample C of pure aluminum alloy of JIS standard AC8A, under the same conditions. The sliding speed used was 0.3 meters/second, the pressure load was 60 kg total or 20 kg/mm$^2$, using as lubricant Castle motor oil of 5W-30 grade, for a test period of one hour at room temperature. The results of these frictional wear tests are shown in FIG. 8, which is a bar chart, in which wear depth on the test block in microns is shown above the horizontal line and wear amount on the mating member in milligrams is shown below the horizontal line, for each of the test samples A, B, and C. From this figure, it will be seen that, while the wear depth on the control test sample block C made of pure aluminum alloy was about 55 microns and the wear amount on the mating member in that case was about 3.4 mg, on the other hand for the test samples A and B made according to the fourth preferred embodiment of the method for producing a composite material object by plastic processing according to the present invention the wear depths were 21 microns and 15 microns respectively, and the wear amounts on the mating members were respectively 3.8 mg and 4.2 mg. Thus it is concluded that the wear resistance characteristics of objects produced according to the present invention are vastly superior to the wear resistance characteristics of objects formed from aluminum alloy only, and further that the amount of wear on cooperating or mating members is not substantially increased.

THE FIFTH PREFERRED EMBODIMENT

Next, according to a fifth preferred embodiment of the method for producing a composite material object by plastic processing according to the present invention, three test samples for tensile strength evaluation were made of a composite material which had been processed by extrusion. These tensile strength test samples were made as follows.

First, a mass of silicon carbide whiskers, of average whisker diameter 0.6 microns and average whisker length 100 microns, oriented substantially randomly in three dimensions, was dispersed in a 20% aqueous solution of colloidal alumina and then stirred up, and then by drying at room temperature three silicon carbide whisker bodies were formed, held together securely by the dried alumina, which functioned as an inorganic binder. The compressive strengths of the three silicon carbide whisker bodies were made to be respectively about 0.6 kg/cm$^2$, about 1.0 kg/cm$^2$, and about 2.0 kg/cm$^2$. The individual silicon carbide whiskers in these whisker bodies were oriented randomly in all three spatial coordinates, i.e., they had a so called three dimensional random orientation. The proportions of the volumes of the three silicon carbide whisker bodies that were actually occupied by silicon carbide whiskers were respectively about 10%, about 20%, and about 30%.

Next, these three silicon carbide whisker bodies were successively placed within the mold cavity of a casting mold, and then were pressure compounded, in a similar manner to that practiced in the first four embodiments described above, with no molten magnesium alloy at approximately 700° C., which was magnesium alloy of JIS standard MC7, at a pressure of approximately 1000 kg/cm$^2$, and this pressure was maintained while the molten magnesium alloy cooled, until it was completely solidified. Thereby, three blocks of silicon carbide whisker-magnesium alloy composite material surrounded by magnesium alloy were manufactured, by this so called high pressure casting method.

Then, as before, from the portion of each of these blocks which was made of composite material, i.e. from the portion thereof reinforced by silicate whiskers, a cylindrical billet about 60 mm in diameter and about 80 mm in length was made. Each of these three billets was then heated up to a temperature of about 600° C. for approximately 60 minutes, so that the magnesium alloy matrix metal this time had a liquid phase proportion of about 60%, i.e. was about three fifths in the molten state. At this time, these billets again cohered largely by virtue of the reinforcing silicon carbide whiskers incorporated therein.

Next, in turn each of the billets while heated as described above was quickly introduced into a horizontal type hot extrusion device (which is not shown in the figures and is per se well known) and was extruded thereby through a 10 mm die at a pressure of approximately 4500 kg/cm$^2$, so as to form each of the billets into a rod shape. At the time of introduction of the blocks into the forging press, this extrusion device was heated up to a temperature of about 300° C. Thus by so called single stage extrusion three rods were obtained, and from each of these rods a test sample was cut, having a parallel portion length of about 25 mm and a parallel portion diameter of about 5 mm.

Each of these test samples was then subjected to $T_6$ heat processing, and then tensile strength tests were performed upon the three thus formed tensile strength test samples, in each case along the extrusion direction. The same type of tensile strength tests were also carried out upon a similarly shaped comparison test sample of pure magnesium alloy only, and also upon three comparison test samples, which are the same as the above three test samples with regard to their compositions, but which were made by the same two stage forging process with the liquid phase proportion of about 20%.

Figure 9:
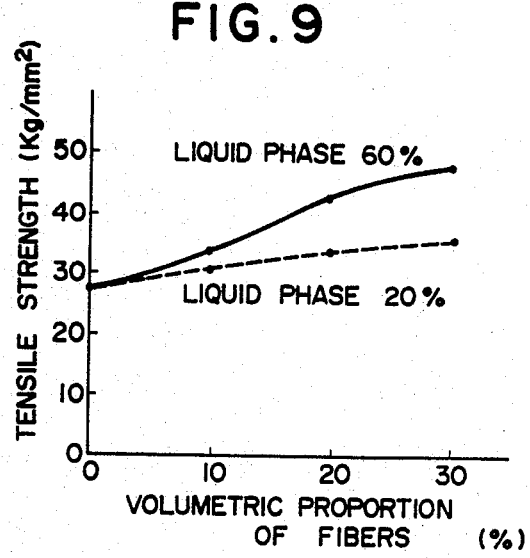
FIG. 9 is a graph relating to the test results of the fifth preferred embodiment of the present invention, in which tensile strength is shown in the vertical direction and the proportion of the volume of a silicon carbide reinforcing whisker body actually occupied by silicon carbide whiskers is shown in the horizontal direction, showing the results for each of three tension test samples manufactured according to said fourth embodiment of the present invention by a solid line and showing the results for each of four comparison test samples by a dashed line.

The results of these tensile strength tests are shown in FIG. 9, which is a graph in which tensile strength is shown in the vertical direction and the proportion of the volume of the silicon carbide reinforcing whisker body actually occupied by silicon carbide whiskers is shown in the horizontal direction, for each of the three tension test samples and for each of the four comparison test samples. From this figure, it will be seen that, while the tensile strength in the extrusion direction was increased by the addition of the reinforcing silicon carbide whiskers in all the cases, the increase of the tensile strength in the extrusion direction was much better in the case of the three test samples manufactured according to the method for producing a composite material object by plastic processing according to the present invention employing a high plasticizing ratio; and further it will be seen that this better increase of tensile strength is more marked, the greater is the proportional volume amount of the reinforcing silicon carbide whiskers—in other words, the solid line (which shows the behavior as the proportional volume amount of the reinforcing silicon carbide whiskers increases the tensile strength in the extrusion direction of the samples manufactured according to the present invention) diverges upwards from the dashed line (which shows the similar behavior of the tensile strength in the extrusion direction of the comparison test samples), in the direction of increasing volume amount of reinforcing whiskers.

Now, it was surmised that the difference in tensile strength was due to preferential alignment of the reinforcing silicon carbide whiskers along the direction of deformation of the composite material. In an effort to verify this, each of the tensile test samples described above which were made according to the present invention was sectioned, and the section was examined under a microscope. However, because the silicon carbide whiskers were very fine, no conclusion could be drawn from this examination, since it was too difficult to discriminate the reinforcing silicon carbide whiskers from the magnesium alloy matrix metal; the result of this investigation was therefore a failure.

But the following matters are surmised by the present inventors. Since as remarked above the increase in the tensile strength in the extrusion direction of the objects made according to the present invention, as compared with the comparison objects, is greater, the greater is the volume proportion of reinforcing silicon carbide whiskers—in other words, the benefit obtained by the present invention is greater, the greater the amount of reinforcing whisker material—therefore it is deduced that the reason for this increase in tensile strength caused by the liquid phase proportion of the at least semi molten matrix metal of the composite material which is being plastically processed being kept high, over 40%, (which as mentioned above is practicable because the overall shape of the composite material is retained at this time by the reinforcing material thereof which is held together by the inorganic binder), is that, when the extrusion process is carried out and the composite material is plastically deformed through the die, during this plastic deformation process the reinforcing silicon carbide whiskers become preferentially oriented along the direction of plastic flow, i.e. along the extrusion direction, from having been substantially randomly oriented in three dimensions, without becoming unduly damaged or broken during this extrusion procedure, as presumably is the case to at least some extent in the case of the comparison tensile strength test samples in which the liquid phase proportion of the semi molten matrix metal of the composite material was lower, being around 20%. Thus, due to this preferential orientation situation, the strength of the finished product is increased in this direction of plastic deformation along the extrusion direction, by the desirable preferential orientation of the reinforcing fibers along this direction.

Although the present invention has been shown and described with reference to several preferred embodiments thereof, and in terms of the illustrative drawings, it should not be considered as limited thereby. Various possible modifications, omissions, and alterations could be conceived of by one skilled in the art to the form and the content of any particular embodiment, without departing from the scope of the present invention. Therefore it is desired that the scope of the present invention, and of the protection sought to be granted by Letters Patent, should be defined not by any of the perhaps purely fortuitous details of the shown embodiments, or of the drawings, but solely by the scope of the appended claims, which follow.

What is claimed is:

1. A method of forming an article of composite material of predetermined shape comprising the steps of:
   (a) forming a mass of reinforcing material bound with an inorganic binder;
   (b) compounding said reinforcing material mass in a matrix of metal by surrounding said bound reinforcing material with said metal in a molten state and applying pressure thereto, thereby forming a solid billet;
   (c) heating said billet to a degree sufficient to melt at least a portion of said matrix such that the percentage of matrix metal in the molten phase is at least 40 percent;

(d) deforming said matrix billet by plastic processing under applied pressure to said predetermined shape; and (e) allowing said deformed billet to cool.

2. A method for producing a composite material object according to claim 1, wherein the volume proportion of reinforcing material in said composite material mass, after step (b), is at least about 3% and less than about 60%.

3. A method for producing a composite material object according to claim 2, wherein the volume proportion of reinforcing material in said composite material mass, after step (b), is at least about 10%.

4. A method for producing a composite material object according to claim 2 or claim 3, wherein the volume proportion of reinforcing material in said composite material mass, after step (b), is less than about 40%.

5. A method for producing a composite material object according to claim 1, wherein the reinforcing material is fibrous.

6. A method for producing a composite material object according to claim 1, wherein the compression strength of the reinforcing material mass, after step (a), is greater than about 0.5 kg/cm$^2$ and is less than 20 kg/cm$^2$.

7. A method for producing a composite material object according to claim 6, wherein the compression strength of the reinforcing material mass, after step (a), is greater than about 0.7 kg/cm$^2$.

8. A method for producing a composite material object according to claim 6 or claim 7, wherein the compression strength of the reinforcing material mass, after step (a), is less than about 15 kg/cm$^2$.

9. A method for producing a composite material object according to claim 1, wherein the inorganic binder used in step (a) is selected from the group consisting of silica, alumina, zirconia, chromia, ceria, zirconia silicate, ferric oxide, aluminum phosphate, and waterglass.

10. A method for producing a composite material object according to claim 1, wherein the method used in step (b) for compounding the reinforcing material and the matrix metal is the high pressure casting method.

* * * * *